United States Patent [19]
Supramaniam et al.

[11] Patent Number: 6,014,290
[45] Date of Patent: Jan. 11, 2000

[54] HEAD SUSPENSION HAVING CONDUCTOR PROTECTING STANDOFFS

[75] Inventors: Karupanan Supramaniam, Hopkins; Jeffrey C. Jones, Hutchinson, both of Minn.

[73] Assignee: Hutchinson Technology Incorporated, Hutchinson, Minn.

[21] Appl. No.: 08/922,195

[22] Filed: Sep. 2, 1997

Related U.S. Application Data

[60] Provisional application No. 60/021,136, Sep. 12, 1996, abandoned.

[51] Int. Cl.[7] .............................. G11B 5/48; G11B 5/54; G11B 33/12
[52] U.S. Cl. ........................... 360/104; 360/105; 360/108
[58] Field of Search ................................. 360/104, 106, 360/108, 105

[56] References Cited

U.S. PATENT DOCUMENTS

| | | | |
|---|---|---|---|
| 3,931,641 | 1/1976 | Watrous | 360/104 |
| 4,792,875 | 12/1988 | Ohdaira | 360/104 |
| 4,819,094 | 4/1989 | Oberg | 360/104 |
| 4,996,616 | 2/1991 | Aoyagi et al. | 360/104 |
| 5,107,383 | 4/1992 | Takeuchi et al. | 360/104 |
| 5,291,359 | 3/1994 | Wolter | 360/104 |
| 5,598,307 | 1/1997 | Bennin | 360/104 |
| 5,680,274 | 10/1997 | Palmer | 360/104 |
| 5,682,279 | 10/1997 | Imasaki | 360/104 |
| 5,724,211 | 3/1998 | Higashiya et al. | 360/104 |
| 5,731,931 | 3/1998 | Goss | 360/104 |

FOREIGN PATENT DOCUMENTS

| | | |
|---|---|---|
| 60-226080 | 11/1985 | Japan . |
| 64-62877 | 3/1989 | Japan . |

*Primary Examiner*—Craig A. Renner
*Attorney, Agent, or Firm*—Faegre & Benson LLP

[57] ABSTRACT

A head suspension for supporting a read/write head adjacent a rotating data storage device has electrical conductors extending across the head suspension that are protected from contact and possible damage by a lifting arm by one or more standoffs that project outwardly from the head suspension adjacent and beyond the electrical conductors where the standoffs will come into contact with the lifting arm as it passes beneath the head suspension.

26 Claims, 10 Drawing Sheets

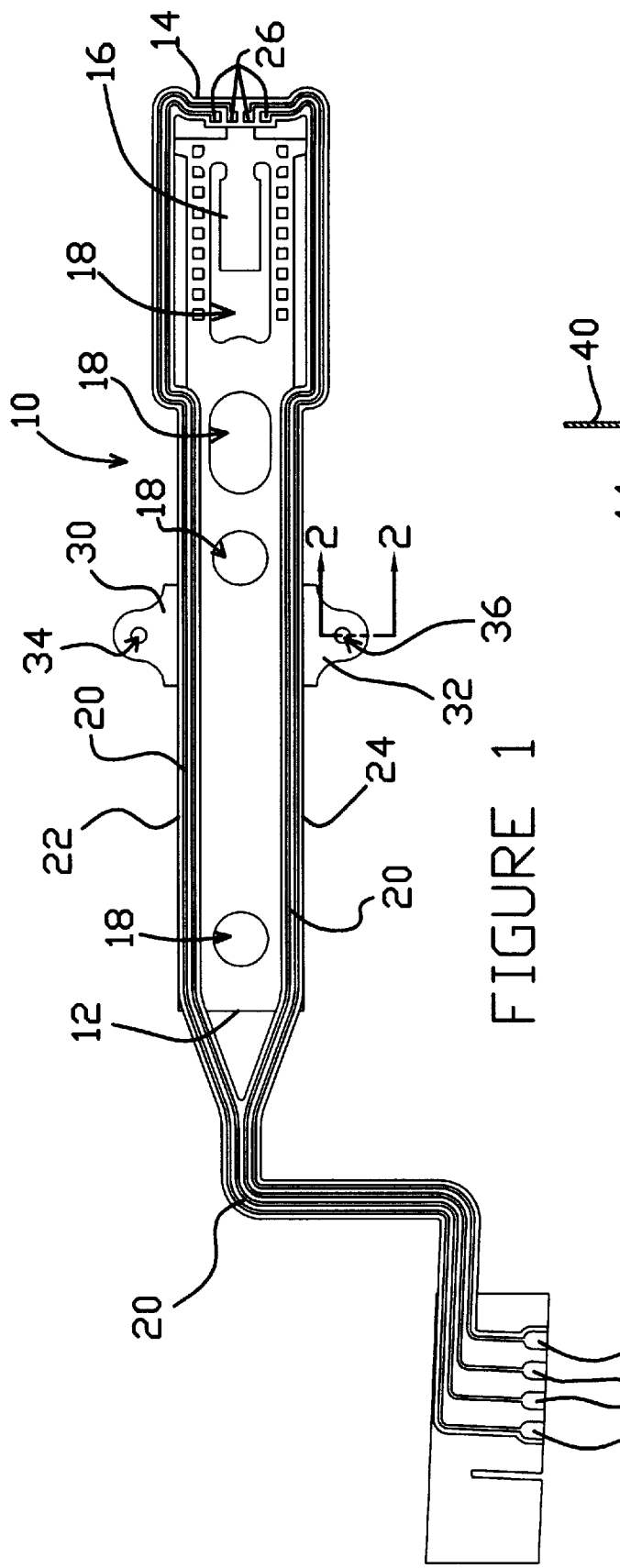

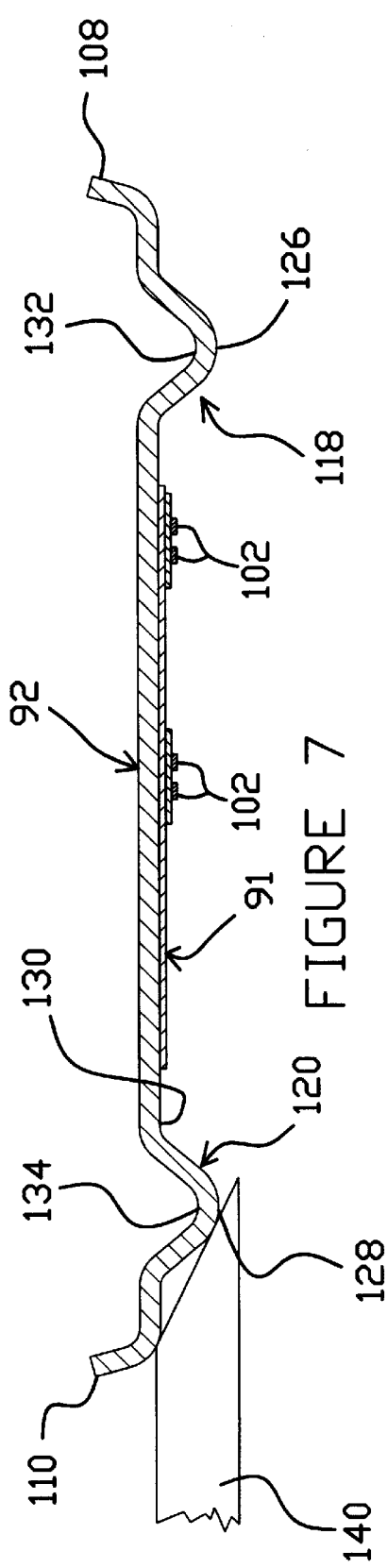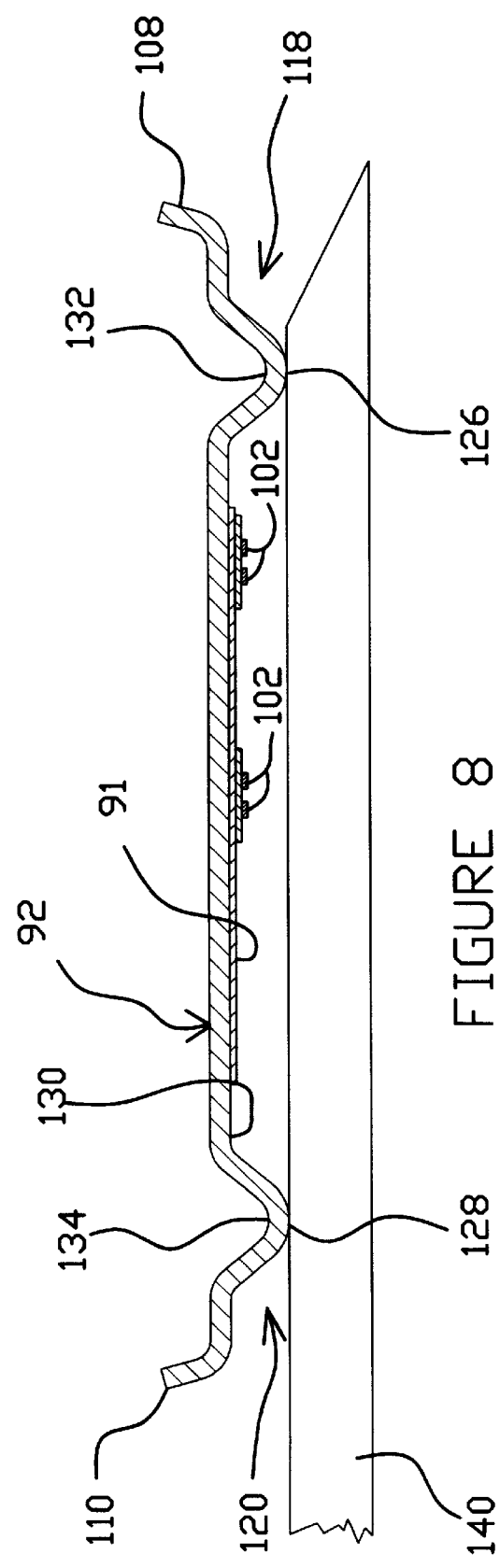

HEAD SUSPENSION HAVING CONDUCTOR PROTECTING STANDOFFS

REFERENCE TO RELATED APPLICATION

This application claims the benefit of U.S. Provisional Application Serial No. 60/021,136 filed on Sep. 12, 1996 abn.

BACKGROUND OF THE INVENTION (1) Field of the Invention

The present invention pertains to a head suspension for supporting a read/write head adjacent a rotating data storage device where electrical conductors extending across the head suspension are protected from contact and possible damage from a lifting arm by one or more standoffs. The standoffs project outwardly from the head suspension adjacent and beyond the electrical conductors where the standoffs will come into contact with the lifting arm as it passes beneath the head suspension.

(2) Description of the Related Art

Most personal computer systems today employ direct access storage devices (DASD) or rigid disk drives for data storage. A conventional disk drive contains a spindle that is rotated by an electric motor at several thousand revolutions per minute while the disk drive is turned on. A plurality of magnetically coated recording disks are mounted on the spindle for rotation therewith at axially spaced positions along the spindle. The number of the disks and the composition of their magnetic material coating determines, in part, the data storage capacity of the disk drive.

Positioned adjacent the peripheries of the rotating disks is a head actuator column. The head actuator column has a plurality of actuator arms thereon, and each actuator arm supports one or more head suspensions that extend in cantilever fashion from the actuator arm to distal ends of the head suspensions. Dynamic storage devices, for example magnetic read/write heads, are supported on sliders at the distal ends of each of the head suspensions. The read/write heads communicate with the central processing unit (CPU) through a series of electrical conductors that extend across the longitudinal length of the head suspension. Various types of known electrical conductors are employed for this purpose including printed circuit conductors, flex circuit conductors, and electrical conductors formed directly on the head suspension by known methods such a vapor deposition or photolithography. These are commonly referred to as traces or integrated conductors. The plurality of actuator arms and their associated head suspensions support the read/write heads adjacent the top and bottom surfaces of each of the plurality of disks supported by the rotating spindle. The rotation of each of the disks creates a current of air adjacent the disk surface. Each of the sliders flies on the air flow with there being an extremely small clearance between the read/write head supported on the slider and the rotating disk surface.

There are basically two types of head actuators, rotary and linear actuators. The rotary actuator moves its head suspensions and their supported read/write heads where the linear actuator moves the head suspensions and their associated read/write heads across the surfaces of the rotating disks linearly. In both types of actuators, the read/write heads supported on the sliders at the distal ends of each of the head suspensions slide in unison on a cushion of flowing air created by the surfaces of the rotating disks. The lifting force of the cushion of flowing air that tends to move the slider and read/write head away from the surface of the disk is counterbalanced by a spring region of the head suspension that biases the slider and read/write head toward the surface of the rotating disk.

When the DASD is not in operation, the disks are not rotating and therefore the cushion of air that lifts each read/write head and slider against the bias of the head suspension spring region is not present. In order to prevent the read/write heads and sliders from contacting the disks when the DASD is first activated or when it is being shut down, a dynamic load/unload ramp or comb is typically employed.

The dynamic comb is basically comprised of a number of lifting arms corresponding to the number of head suspensions. The lifting arms project from the dynamic comb like the teeth of a comb. The dynamic comb may be attached to the base of the disk drive so that when the actuator assembly of a rotary actuator swings the head suspensions to the outer peripheries of the disks, the head suspensions contact the ramp-like structure of the stationary comb to lift them out of contact and away from the disk surfaces whenever the disk drive is non-operational. In this manner, the lifting arms of the dynamic comb hold each of the head suspensions in a position relative to the disks where the read/write head and slider of each of the head suspensions is positioned at the periphery of the disk and a small distance from the surface of the disk when the disks are not rotating, thus preventing the read/write heads and sliders from contacting the surfaces of the disks. The dynamic comb holds the read/write heads and sliders in spaced positions from the surfaces of the disk, both when the DASD is first activated prior to the actuator column moving the head suspensions over the surfaces of the disks and when the DASD is shut down and the actuator column moving the head suspensions from the surfaces of the disks. When the DASD is operating and the disks are rotated by the spindle the lifting arms of the dynamic comb are disengaged from the head suspensions and do not affect their operation.

During the manufacture of DASDs, it is also often necessary to lift and separate head suspensions mounted on the actuator arms of an actuator column to facilitate in some manufacturing process steps and to keep the head suspensions apart from one another to avoid damaging them by their coming into contact. In these situations, a shipping comb is used having lifting arms that are inserted beneath one side of the head suspensions to maintain the spacing between the suspensions. When the construction of the actuator assembly is complete it is often moved to another area in the manufacturing facility and often moved to a geographically separate manufacturing facility. The shipping comb remains with the actuator assembly as it is moved to prevent the head suspension assemblies from contacting each other. This is why this particular comb is typically referred to as a "shipping comb".

Another comb is often inserted between the head suspensions of the actuator assembly just prior to the head suspensions being slipped between the stack of disks during the assembly of the disk stack and the actuator assembly to the base of a disk drive. Once the heads on the head suspensions are in an appropriate location, the comb, typically called a "merging comb", is removed from the actuator assembly leaving the head suspensions sandwiched between the disks. The "shipping comb" described earlier could also be used for this purpose.

It has been observed that when lifting arms, either of a shipping comb, a merging comb or a dynamic comb, pass beneath the lateral edge and underside of a head suspension, at times the distal edge of the lifting arm will contact an edge of the head suspension causing damage to a component part of that head suspension. For example, the distal edge of a lifting arm may come into contact with a flexure as it moves beneath the head suspension causing damage to the flexure and affecting the operation of the head suspension. Also, at times the distal end of a lifting arm will come into contact with an electrical conductor of a head suspension as the lifting arm is move beneath a lateral edge and the underside of the head suspension, causing damage to that conductor. This is likely to occur with head suspensions employing traces or integrated conductors such as printed circuit conductors or other electrical conductors formed directly on the surface of the head suspension engaged by the lifting arm. What is needed to eliminate this problem is the design of a head suspension that protects its electrical conductors from contact with a lifting arm of either a shipping comb, a merging comb or a dynamic comb.

SUMMARY OF THE INVENTION

The present invention provides standoffs on a head suspension positioned adjacent the electrical conductors that extend along the longitudinal length of the head suspension. The standoffs project outwardly from the surface of the head suspension a distance greater than the thickness of the electrical conductors or the distance which the electrical conductors project outwardly from the surface of the head suspension. The standoffs are positioned on the head suspension adjacent the lateral edge of the head suspension beneath which the lifting arm, of either a shipping comb, merging comb or dynamic comb, passes where the distal end of the lifting arm will first engage with the standoff as the lifting arm passes beneath the head suspension. The standoff, having a greater projecting distance than the thickness or projecting distance of the electrical conductors, spaces the lifting arm from the electrical conductors as the lifting arm passes beneath the electrical conductors. In this manner, the standoff protects the electrical conductors from contact with the lifting arm.

The head suspension with standoffs is primarily designed to protect traces or integrated conductors such as flexible circuits on the surface of the head suspension from being damaged by the lifting arm, however, the head suspension with standoffs may be employed to protect any type of electrical conductor on the head suspension from contact with the lifting arm. Preferably, the standoff has a rounded surface that facilitates its passing over the distal end of the lifting arm as it comes into contact which the lifting arm. In one embodiment the standoff is a circular formation in the head suspension with a convex surface projecting from the side of the head suspension beneath which the lifting arm passes, and a concave surface recessed into the opposite surface of the head suspension. In another embodiment the standoff is an elongate formation that extends along the longitudinal length of the head suspension. The elongate standoff has a ridged surface projecting from the surface of the head suspension beneath which the lifting arm passes, and a troughed surface recessed into the opposite surface of the head suspension. The ridged surfaced is convex in lateral cross section and the troughed surface is concave in lateral cross section. The convex cross section of the ridged surface also facilitates the passing of the surface over the distal end of the lifting arm when it comes into contact with the lifting arm. In both embodiments of the standoffs, they are preferably formed into the metal of the head suspension by yielding the metal. In this manner, the overall mass of the head suspension is not affected by the addition of the standoffs. Other methods of manufacture may be employed, for example, providing the standoffs as separate component parts that are secured to the surface of the head suspension by spot welding or adhesives.

BRIEF DESCRIPTION OF THE DRAWINGS

Further objects and features of the present invention are revealed in the following detailed description of the preferred embodiments of the invention and in the drawing figures wherein:

FIG. 1 is a plan view of a flexure employing the standoff of the invention;

FIG. 2 is a partial elevation view, in section, of the standoff of FIG. 1 taken along the line 2—2 of FIG. 1;

FIG. 7 is a view similar to that of FIG. 6 showing the initial contact of the distal edge of a lifting arm with the standoff;

FIG. 8 is a view similar to that of FIG. 7 showing the lifting arm positioned in engagement with both standoffs;

DETAILED DESCRIPTION OF THE PREFERRED EMBODIMENTS

Figure 3:
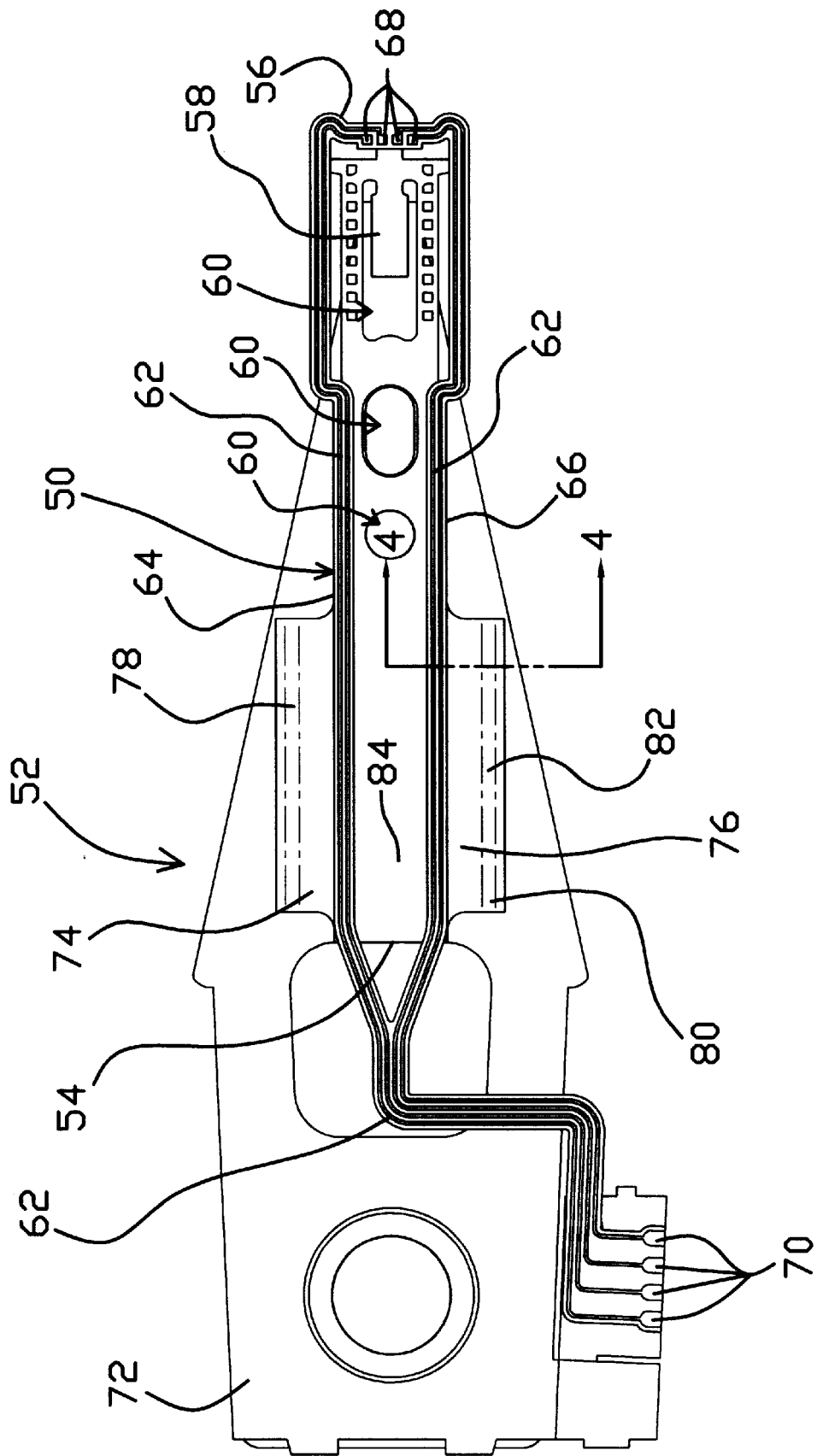
FIG. 3 is a plan view of a head suspension having a flexure employing a further embodiment of the standoff of the invention.

FIGS. 1 and 2 show a first embodiment of the standoff of the invention employed on a flexure of a head suspension. The particular flexure shown in FIG. 1 is for illustrative purposes only and it should be understood that the various embodiments of the standoffs to be described may be employed on substantially any type of flexure. Referring to FIG. 1, the flexure 10 has a longitudinal length with opposite proximal 12 and distal 14 ends. Preferably, the flexure is constructed of a thin sheet of stainless steel as is conventional. The flexure is provided with a tongue 16 for supporting a slider and read/write head adjacent its distal end 14. FIG. 1 is a view of the underside of the flexure to which the read/write head and slider would be mounted. Various tooling and weight reduction apertures 18 are provided in the flexure along its longitudinal length. A plurality of electrical conductors 20 extend along the longitudinal length of the flexure adjacent its opposite lateral edges 22, 24. What is meant by "electrical conductors" is any type of conductor typically employed in communicating a read/write head supported on a head suspension with a CPU of a DASD. In the preferred embodiment of the invention however, the electrical conductors 20 are traces or integrated conductors such as printed circuit board conductors. The electrical conductors 20 extend from input connectors 26 adjacent the flexure distal end 14 to output connectors 28 that are remote from the flexure 10 and are usually mounted on the proximal end of a load beam to which the flexure is attached.

A pair of projections 30, 32 extend laterally outwardly from the opposite lateral edges 22, 24 of the flexure. The first embodiments of the standoffs 34, 36 are formed in each of these projections. In this embodiment the standoffs 34, 36 are identical and are both formed into the flexure of the head suspension as a circular formation having a convex surface 38 projecting outwardly from the surface 40 of the flexure on which the electrical conductors are mounted, and a concave surface 42 recessed into the opposite surface 44 of the flexure. Preferably, the standoffs 34, 36 are formed into the material of the flexure by stamping and thereby yielding the material of the flexure. In this manner, the standoffs can be added to the flexure without increasing the mass of the head suspension. Other types of manufacturing methods may be employed to add the standoffs to the head suspension such as attaching the standoffs as separate parts to the head suspension by spot welding or adhesives. In the embodiments of FIGS. 1 and 2, the standoffs 34, 36 are formed in the flexure with the convex surface 38 of the standoffs projecting outwardly a predetermined distance from the flexure surface 40 that is greater than the thickness of the electrical conductors 20 or the distance that the electrical conductors project outwardly from the flexure surface 40. In addition, the standoffs 34, 36 are positioned laterally outwardly from the electrical conductors 20 and at a position along the longitudinal length of the flexure where they will come into contact with a lifting arm of a shipping comb, a merging comb or a dynamic comb. With this positioning of the standoffs 34, 36, it can be seen that the lifting arm will first come into contact with the convex surface 38 of the standoff before it passes beneath the electrical conductors 20 as the lifting arm is moved under the flexure surface 40. In this manner, the standoffs 34, 36 will protect the electrical conductors 20 from damage due to contact with the lifting arm moving beneath the flexure.

Figure 4:
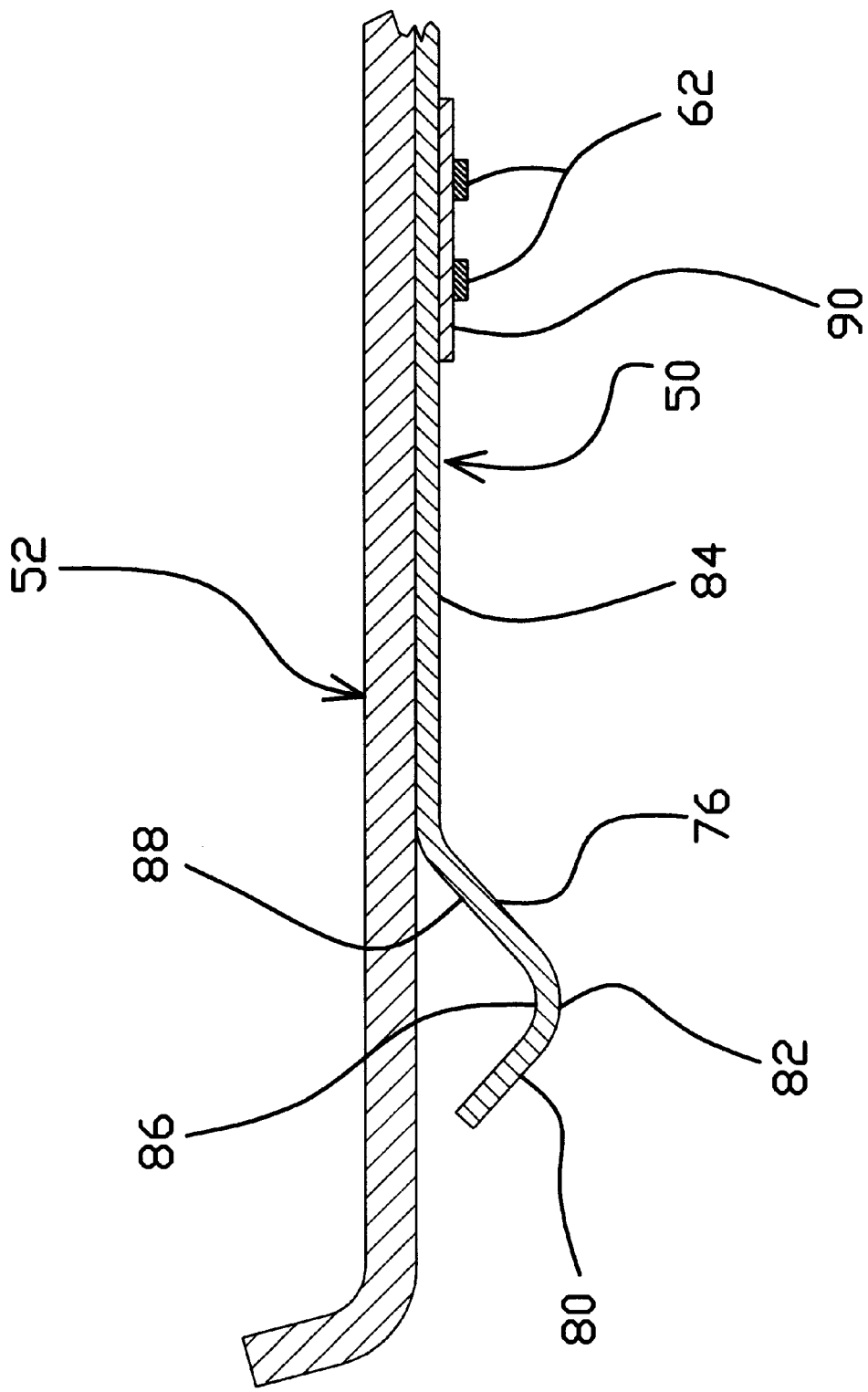
FIG. 4 is a partial elevation view, in section, of the standoff of FIG. 3 taken along the line 4—4.

FIGS. 3 and 4 show a further embodiment of the standoffs of the invention employed on a head suspension comprised of a flexure 50 and a load beam 52. The flexure 50 is similar to the previously described flexure and has a proximal end 54, a distal end 56, a tongue 58 and various tooling and weight reduction apertures 60. Electrical conductors 62 extend along the longitudinal length of the head suspension adjacent the opposite lateral edges 64, 66 of the flexure. The electrical conductors 62 extend from input connectors 68 adjacent the flexure distal end 56 to output connectors 70 remote from the flexure 50 and mounted to a proximal end 72 of the load beam.

The flexure is also provided with laterally extending projections 74, 76 from its opposite lateral edges 64, 66, just as in the previous embodiment. However, the projections 74, 76 extend along a greater portion of the longitudinal length of the flexure. A pair of standoffs 78, 80 are formed in the projections 74, 76. The standoffs are formed as elongate formations having a ridged surface 82 projecting outwardly from the flexure surface 84 on which the electrical conductors 62 are attached, and an opposite troughed surface 86 recessed inwardly into the opposite flexure surface 88. The surfaces can best be seen in FIG. 4 where it can also be seen that the ridged surface 82 is convex in lateral cross section and the troughed surface 86 is concave in lateral cross section in a similar manner to that of the first described embodiment shown in FIG. 2. Also in FIG. 4 is a layer of dielectric 90 that separates the electrical conductors 62 from the metal of the flexure 50 and load beam 52. The dielectric increases the distance to which the electrical conductors 62 extend outwardly from the flexure surface 84. However, as shown in FIG. 4, the standoffs 78, 80 project outwardly from the surface of the head suspension a greater distance than do the electrical conductors 62. With this configuration of the standoffs 78, 80, a lifting arm passing beneath the flexure surface 84 will come into contact with the standoffs 78, 80 as it passes beneath the head suspension and the standoffs will space the lifting arm from the electrical conductors 62 preventing their being damaged by the lifting arm.

It is also pointed out that the standoffs 78, 80 of the embodiment shown in FIGS. 3 and 4 extend across the entire longitudinal length of their flexure projections 74, 76. This enables the standoffs to be formed in the projection by stamping the standoffs and yielding the metal of the flexure projections, or by forming bends in the projections. In the previous embodiment of the standoffs shown in FIGS. 1 and 2 where the standoffs are completely surrounded by the material of the flexure projections 30, 32, it is necessary to yield the metal of the flexure while forming the standoffs in order to avoid altering the portions of the projections surrounding the standoffs. As with the embodiment of FIGS. 1 and 2, the embodiment of the standoffs shown in FIGS. 3 and 4 may also be formed by other manufacturing methods such as adding the standoffs as separate component parts by spot welding or adhering the standoffs to the head suspension.

Figure 5:
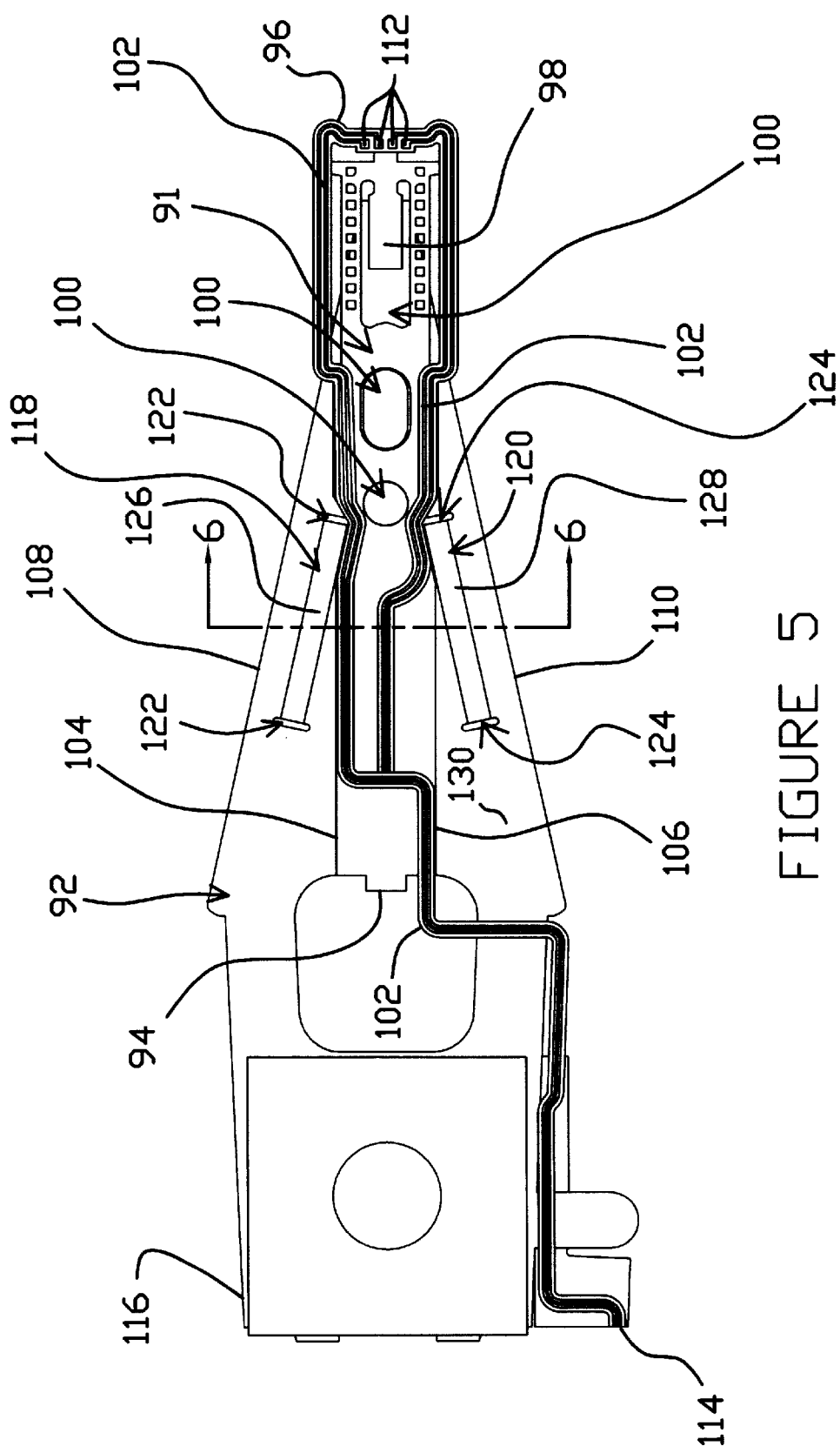
FIG. 5 is a plan view of a head suspension employing a further embodiment of the standoff of the invention on a load beam of the suspension.
Figure 6:
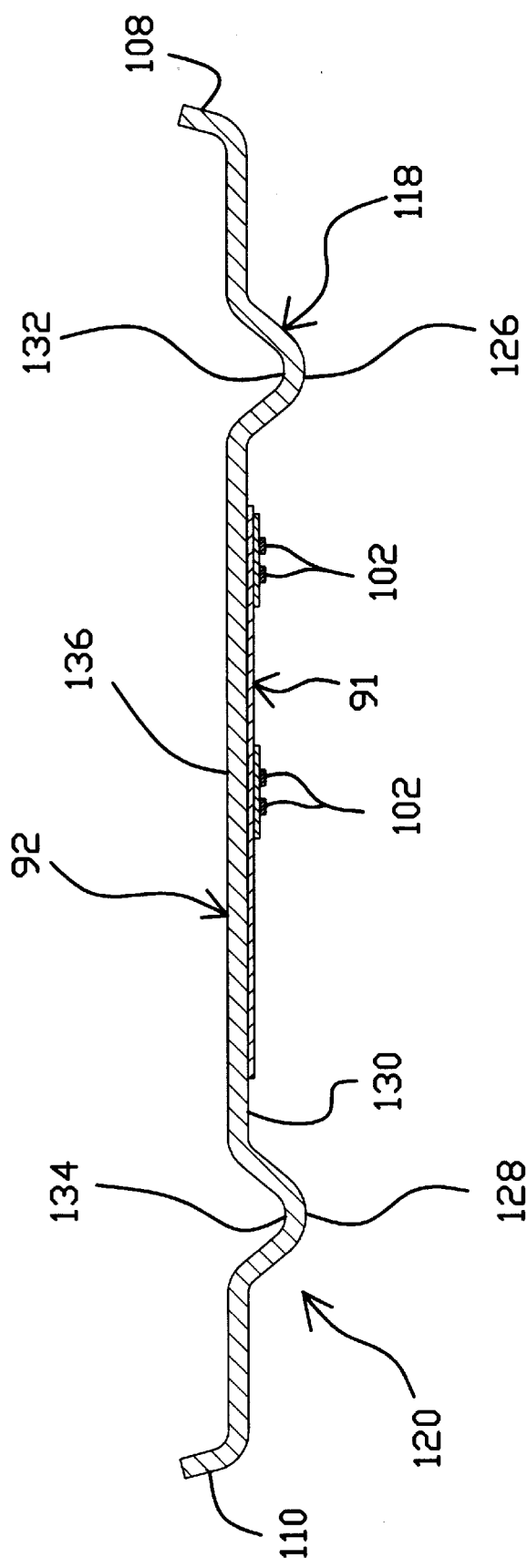
FIG. 6 is an elevation view, in cross section, of the standoff of FIG. 5 taken along the line 6—6.

FIGS. 5 and 6 show a still further embodiment of the standoffs of the invention employed on a head suspension comprised of a flexure 91 and a load beam 92. As in the previous embodiments, the flexure 91 and load beam 92 are illustrative only of one environment in which this embodiment of the standoffs may be employed. The flexure 91 has a longitudinal length with opposite proximal 94 and distal 96 ends, a tongue 98 and various tooling and weight reduction apertures 100. Electrical conductors 102 extend along the longitudinal length of the flexure 91 adjacent its opposite lateral edges 104, 106 and spaced laterally inwardly from the opposite lateral edges 108, 110 of the load beam 92. The electrical conductors 102, extend from input connections 112 adjacent the flexure distal end 96 to proximal ends 114 of the electrical conductors adjacent the head suspension proximal end at the load beam proximal end 116.

In the embodiment of FIG. 5, the standoffs 118, 120 are formed in the load beam 92 and not in the flexure as in the previous embodiments. Although the particular standoffs 118, 120 shown in FIG. 5 may also be employed in a flexure, just as the flexure standoffs of the previous embodiments may be employed on a load beam. The standoffs 118, 120 extend generally along the longitudinal length of the head suspension and each has a pair of apertures 122, 124 at longitudinally spaced opposite ends of the standoffs. Each of the standoffs 118, 120 is an elongate formation having a ridged surface 126, 128 that projects outwardly from the load beam surface 130 on which the flexure 91 is secured and over which the electrical conductors 102 extend. The standoffs also have opposite troughed surfaces 132, 134 recessed into the opposite surface 136 of the load beam and head suspension.

As with the standoff embodiment of the FIGS. 3 and 4, the standoffs 118, 120 of FIG. 5 have convex surfaces in lateral cross section that project outwardly from the load beam surface 130 a distance beyond the distance that the electrical conductors 102 project from the head suspension surface, and thereby provide protection to the electrical conductors from contact with a lifting arm just as in the previously described embodiments. By providing the pairs of apertures 122, 124 at the longitudinally opposite ends of the standoffs 118, 120, the standoffs can be formed into the load beam of the head suspension by stamping or yielding the metal of the load beam without creating stress concentrations at the longitudinally opposite ends of the standoffs. This enables this particular embodiment of standoffs 118, 120 to be formed in the load beam at positions spaced laterally inwardly from the opposite lateral edges 108, 110 of the load beam 92 and head suspension. The apertures 122 are not necessary in this construction of the standoffs, but are preferred.

FIGS. 7 and 8 illustrate the passage of a lifting arm 140 beneath the embodiment of the standoffs 118, 120 employed on the head suspension of FIGS. 5 and 6. The Figures may also illustrate the passage of the head suspension over the stationary lifting arm. In FIG. 7 the distal end of the lifting arm 140 is first coming into contact with one of the standoffs 120. It can be seen in FIG. 7 that the convexity of the ridged surface 128 in lateral cross section facilitates the passage of the standoff 120 over the lifting arm distal end. FIG. 8 shows the position of the lifting arm after it has moved completely beneath the head suspension load beam surface 130 and is in engagement with both standoffs 118, 120. In FIG. 8 it can be seen how the presence of the standoffs 118, 120 protects the electrical conductors 102 from contact with and possible damage from the lifting arm 140.

Figure 9:
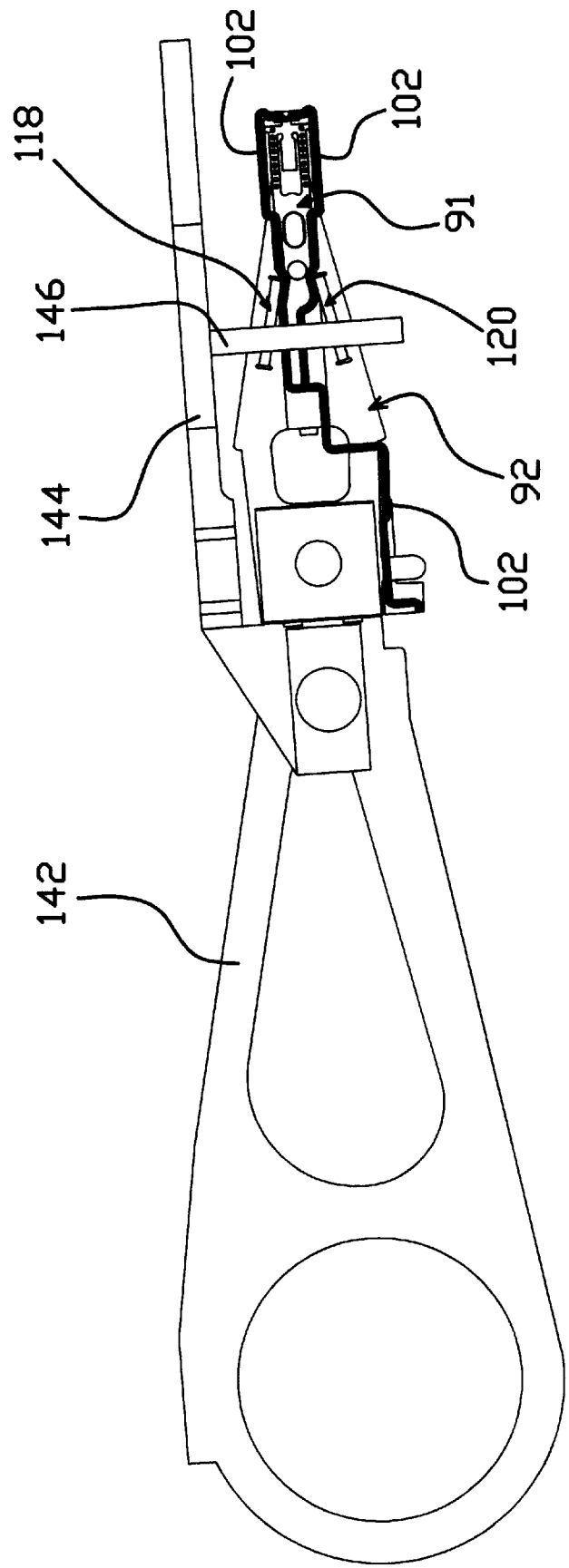
FIG. 9 is a plan view of the head suspension of FIG. 5 attached to an actuator arm and with its standoffs engaging the lifting arm of a shipping comb.

FIG. 9 shows the flexure 91 and load beam 92 of the head suspension of FIG. 5 secured to an actuator arm 142. This figure also shows a conventional shipping comb 144 having a lifting arm 146 as commonly used in the manufacture of a DASD to separate head suspensions stacked on an actuator column from each other. As shown in FIG. 9, the lifting arm 146 of the shipping comb 144 extends across the pair of standoffs 118, 120 formed in the load beam of the head suspension, and thereby spaces the lifting arm from the electrical conductors 102 protecting the electrical conductors.

Figure 10:
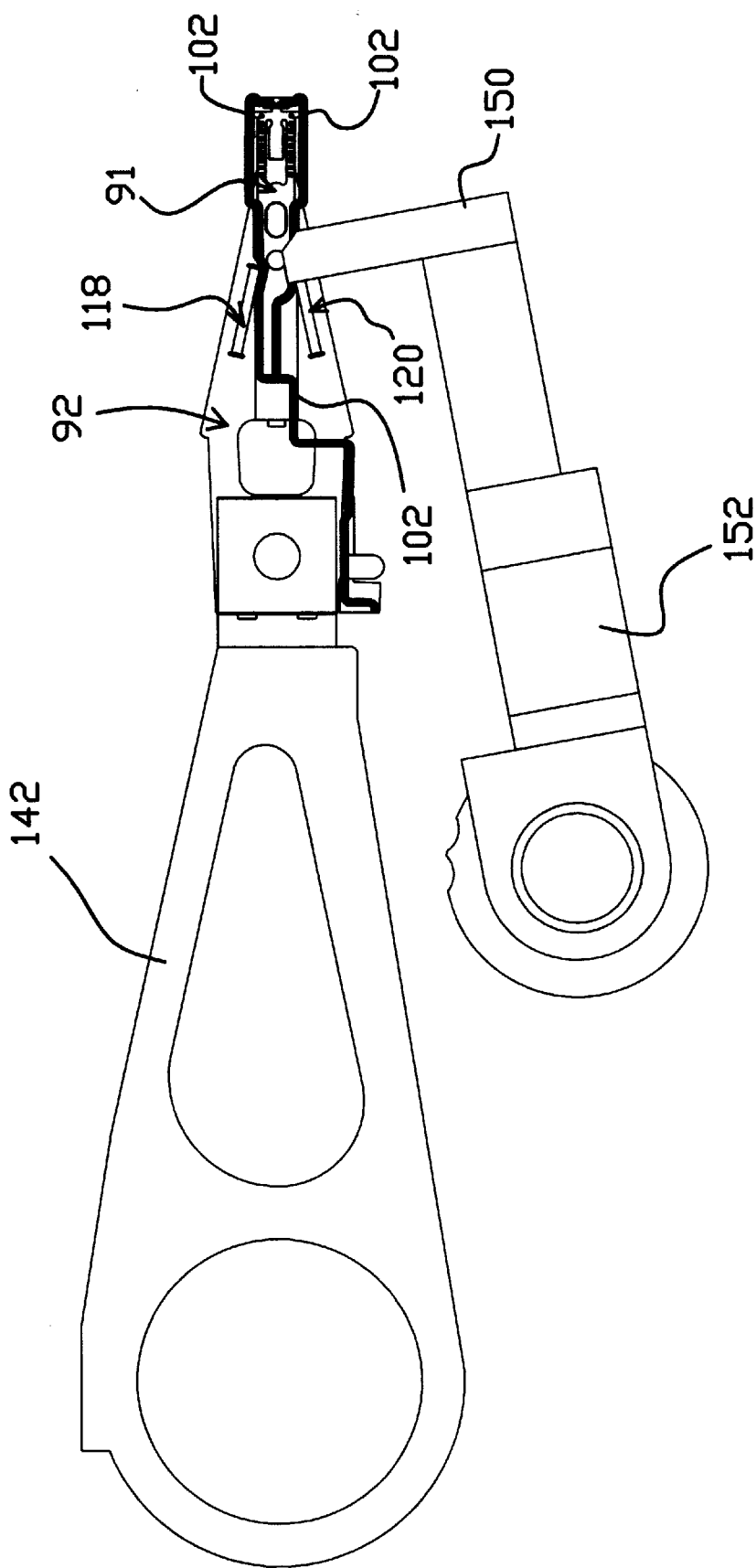
FIG. 10 is a plan view of the head suspension of FIG. 5 on an actuator arm and with one of its standoffs in engagement with the lifting arm of a merging comb.

FIG. 10 shows the same flexure 91 and load beam 92 forming the head suspension secured to the actuator arm 142 of FIG. 9, and a lifting arm 150 of a typical merging comb 152. The lifting arm 150 extends across one of the head suspension standoffs 120, and the standoff thereby spaces the lifting arm from the electrical conductors 102 protecting the electrical conductors from the lifting arm.

Figure 11:
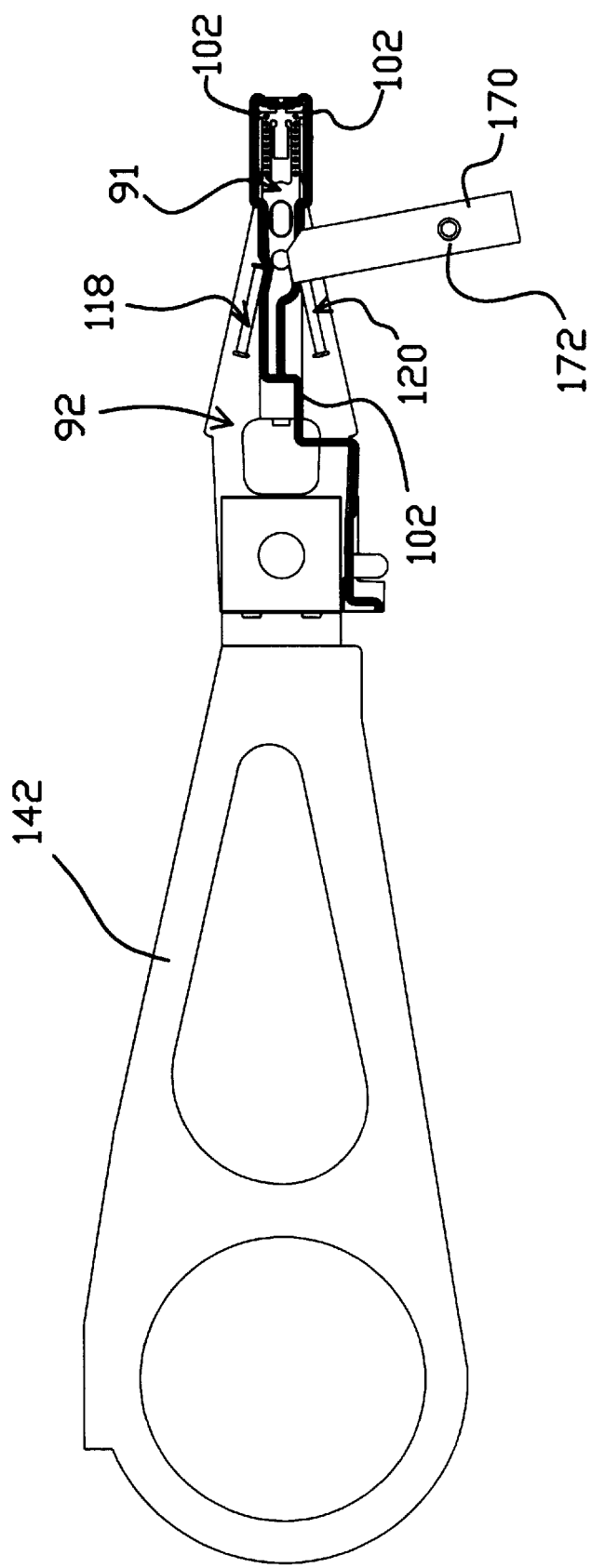
FIG. 11 is a plan view of the head suspension of FIG. 10 with one of its standoffs in engagement with the lifting arm of a dynamic load/unload comb.

FIG. 11 shows the same flexure 91 and load beam 92 forming the head suspension secured to the actuator arm 142 of FIG. 9, and a lifting arm 170 of a typical dynamic load/unload comb attached by a fastener 172 to the base (not shown) of a DASD.

Figures 12, 13:
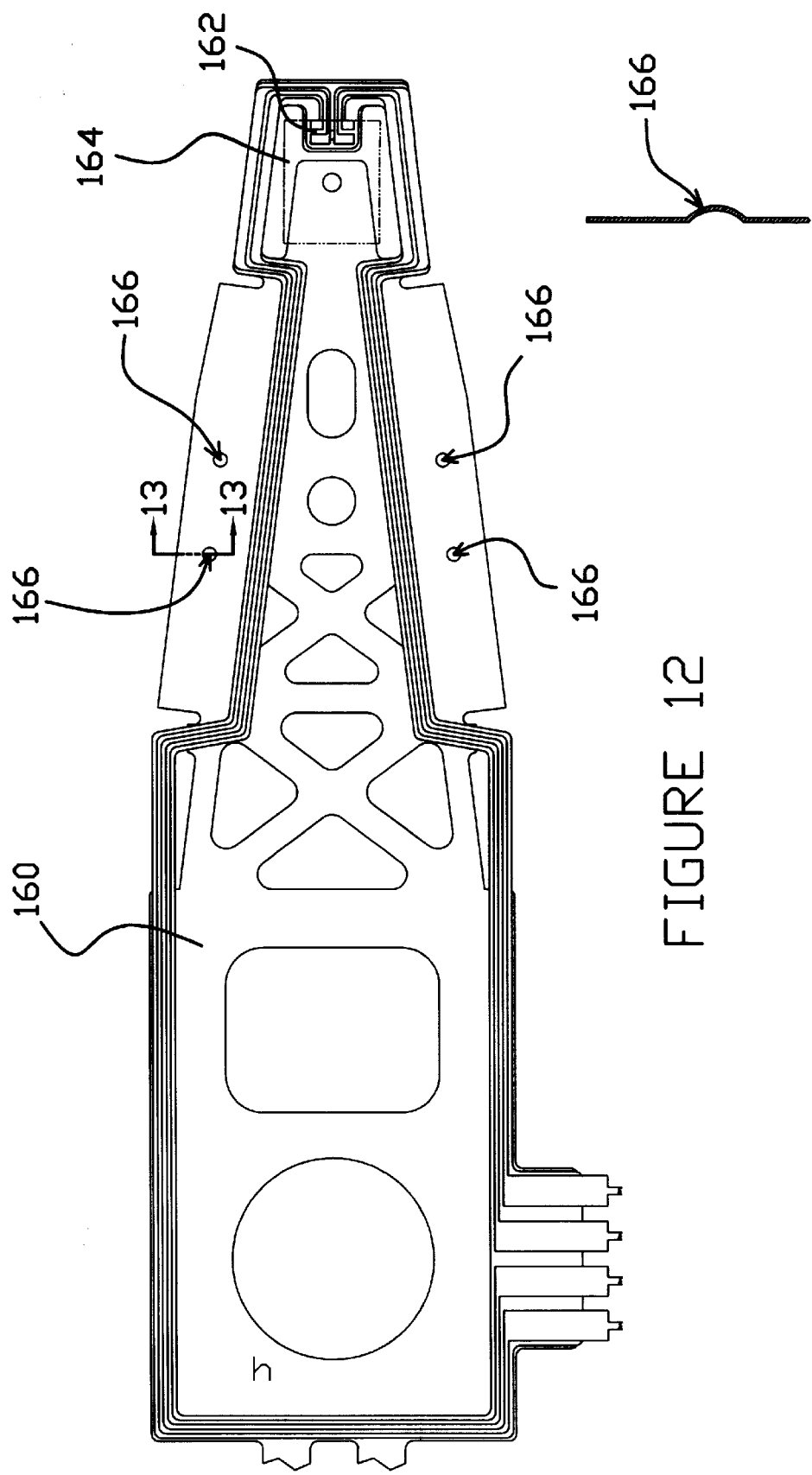
FIG. 12 is a plan view of a head suspension comprising a load beam and gimbal employing the standoff of the present invention.
FIG. 13 is a partial elevation view, in section, of the standoff of FIG. 12 taken along the line 13—13.

FIGS. 12 and 13 illustrate a head suspension comprised of a load beam 160 having an integral gimbal 162 supporting a slider 164 which in turn supports a read/write head. The standoffs 166 provided on the load beam 160 are the same as those of the first described embodiment of FIGS. 1 and 2 which were employed on a flexure. FIGS. 12 and 13 illustrate that the various embodiments of the standoffs described herein may be employed in many different operative environments and the different embodiments of standoffs may be used interchangeably on both flexures and load beams.

Although the invention has been described by reference to specific embodiments, it should be understood that other variations and adaptations of the invention can be made without departing from the intended scope of the invention defined by the following claims.

What is claimed:

1. A head suspension for supporting a head slider adjacent a rigid disk within a dynamic storage device, the head suspension having a longitudinal length, a lateral width defining opposite lateral edges, opposite first and second surfaces, and comprising an actuator mounting region at a proximal end of the head suspension, a head slider supporting region at a distal end of the head suspension for supporting the head slider on the first surface side of the head suspension, a stiffened rigid region intermediate the actuator mounting region and the head slider supporting region, integrated conductors extending across the first surface over at least a portion of the rigid region to the head slider supporting region, and a standoff spaced from the lateral edges and projecting outwardly from the first surface within at least a portion of the rigid region, said standoff extending beyond the integrated conductors and further than any other structure along a transverse path defined across the head suspension including the standoff.

2. The head suspension of claim 1, wherein the standoff is spaced laterally inwardly from one of the lateral edges.

3. The head suspension of claim 2, wherein the standoff is positioned between the integrated conductors and the one of the lateral edges.

4. The head suspension of claim 2 wherein the standoff is one of a pair of standoffs, the pair of standoffs are spaced laterally inwardly from the opposite lateral edges and the integrated conductors extend between the pair of standoffs.

5. The head suspension of claim 4 wherein the head suspension is comprised of a load beam and a flexure secured to the load beam, and the pair of standoffs are on the flexure.

6. The head suspension of claim 4 wherein the head suspension is comprised of a load beam and a flexure secured to the load beam, and the pair of standoffs are on the load beam on laterally opposite sides of the flexure.

7. The head suspension of claim 6 wherein the integrated conductors extend across the flexure between the pair of standoffs.

8. The head suspension of claim 1 wherein the standoff is one of a plurality of standoffs that are all spaced laterally inwardly from the opposite lateral edges of the head suspension and are arranged on laterally opposite sides of the integrated conductors.

9. The head suspension of claim 1 wherein the standoff is one of a plurality of standoffs that are arranged on laterally opposite sides of the integrated conductors and spacially arranged along the longitudinal length of the head suspension.

10. The head suspension of claim 1 wherein the standoff is a circular formation in the head suspension having a concave surface recessed into the second surface of the head suspension and a convex surface projecting from the first surface of the head suspension.

11. The head suspension of claim 1 wherein the standoff is an elongate formation extending along the longitudinal length of the head suspension having a troughed surface recessed into the second surface of the head suspension and a ridged surface projecting from the first surface of the head suspension.

12. A head suspension for supporting a head slider adjacent a rigid disk within a dynamic storage device, the head suspension having a longitudinal length, a lateral width defining opposite lateral edges, opposite first and second surfaces, and comprising an actuator mounting region at a proximal end of the head suspension, a head slider supporting region at a distal end of the head suspension for supporting the head slider on the first surface side of the head suspension, a stiffened rigid region intermediate the actuator mounting region and the head slider supporting region, integrated conductors extend longitudinally across the first surface over at least a portion of the rigid region and project outwardly a first distance from the first surface, and a standoff spaced from the lateral edges and positioned within at least a portion of the rigid region on the first surface adjacent to the electrical conductors, wherein the standoff projects outwardly a second distance from the first surface that is greater than the first distance and further than any other structure along a transverse path defined across the head suspension including the standoff, and wherein the standoff has a convex surface in lateral cross section.

13. The head suspension of claim 12, wherein the standoff is positioned laterally inwardly from one of the lateral edges between the integrated conductors and the one of the lateral edges.

14. The head suspension of claim 12, wherein the standoff is one of a pair of standoffs, the pair of standoffs are spaced laterally inwardly from the opposite lateral edges and the integrated conductors extend longitudinally between the pair of standoffs.

15. The head suspension of claim 14, wherein the head suspension is comprised of a load beam and a flexure secured to the load beam, the pair of standoffs are on the flexure and the integrated conductors extend across the flexure between the pair of standoffs.

16. The head suspension of claim 14, wherein the head suspension includes a load beam, the pair of standoffs are on the load beam and the integrated conductors extend across the load beam between the pair of standoffs.

17. The head suspension of claim 14, wherein each standoff of the pair is a circular formation on the head suspension having a concave surface recessed into the second surface of the head suspension and a convex surface projecting from the first surface of the head suspension.

18. The head suspension of claim 14, wherein each standoff of the pair is an elongate formation extending along the longitudinal length of the head suspension having a troughed surface recessed into the second surface of the head suspension and a ridged surface projecting from the first surface of the head suspension.

19. A method of protecting integrated conductors on a head suspension of the type having a longitudinal length, opposite first and second lateral edges, opposite first and second surfaces, an actuator mounting region at a proximal end of the head suspension, a head slider supporting region at a distal end of the head suspension for supporting the head slider on the first surface side of the head suspension, a stiffened rigid region intermediate the actuator mounting region and the head slider supporting region, wherein the integrated conductors are protected from contact with and possible damage by a lifting arm that at various times passes beneath the first lateral edge and the first surface of the head suspension to lift the head suspension, the method comprising:

positioning integrated conductors on the first surface of the head suspension between the opposite first and second lateral edges of the head suspension so that the integrated conductors extend across the first surface over at least a portion of the rigid region;

positioning a first standoff on the first surface within at least a portion of the rigid region of the head suspension between the integrated conductors and the first lateral edge beneath which the lifting arm passes; and dimensioning the standoff to project outwardly from the first surface a distance greater than a distance that the integrated conductors project outwardly from the first surface and further than any other structure along a transverse path defined across the head suspension including the standoff spaced from the first lateral edge.

20. The method of claim 19, further comprising:

positioning a second standoff on the first surface within at least a portion of the rigid region of the head suspension between the integrated conductors and the second lateral edge so that the first and second standoffs are on laterally opposite sides of the integrated conductors.

21. The method of claim 20, further comprising:

forming each standoff as a circular formation in the head suspension having a concave surface recessed into the second surface of the head suspension and a convex surface projecting from the first surface of the head suspension.

22. The method of claim 20, further comprising:

forming each standoff as an elongate formation extending along the longitudinal length of the head suspension having a troughed surface recessed into the second surface of the head suspension and a ridged surface projecting from the first surface of the head suspension.

23. The head suspension of claim 1, wherein the rigid region includes a side edge rail for stiffening the rigid region.

24. The head suspension of claim 23, wherein the side edge rail extends from the second surface side of the head suspension.

25. The head suspension of claim 12, wherein the rigid region includes a side edge rail for stiffening the rigid region.

26. The head suspension of claim 25, wherein the side edge rail extends from the second surface side of the head suspension.

* * * * *